(12) United States Patent
Loy et al.

(10) Patent No.: US 7,090,393 B2
(45) Date of Patent: Aug. 15, 2006

(54) USING THERMAL IMAGING TO PREVENT LOSS OF STEAM TURBINE EFFICIENCY BY DETECTING AND CORRECTING INADEQUATE INSULATION AT TURBINE STARTUP

(75) Inventors: David Forrest Loy, Ballston Lake, NY (US); Daniel Gerard Menzel, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 88 days.

(21) Appl. No.: 10/318,198

(22) Filed: Dec. 13, 2002

(65) Prior Publication Data

US 2004/0114660 A1     Jun. 17, 2004

(51) Int. Cl.
    *G01N 17/00*    (2006.01)
    *G01N 21/09*    (2006.01)
    *G01K 13/08*    (2006.01)

(52) U.S. Cl. .............................. 374/57; 374/4; 374/47; 374/144

(58) Field of Classification Search .................. 374/57, 374/45, 47, 137, 141, 142, 144, 4, 5, 6, 120, 374/121; 324/557
See application file for complete search history.

(56) References Cited

U.S. PATENT DOCUMENTS

| | | | | |
|---|---|---|---|---|
| 3,955,359 A | * | 5/1976 | Yannone et al. | 60/39.281 |
| 4,208,882 A | * | 6/1980 | Lopes et al. | 60/653 |
| 4,246,785 A | * | 1/1981 | Sellers et al. | 374/43 |
| 4,277,943 A | * | 7/1981 | Silvestri et al. | 60/646 |
| 4,333,339 A | * | 6/1982 | McNeely et al. | 374/139 |
| 4,455,614 A | * | 6/1984 | Martz et al. | 700/288 |
| 4,486,103 A | * | 12/1984 | Ando | 374/5 |
| 4,890,244 A | * | 12/1989 | Baggio et al. | 702/84 |
| 5,386,117 A | * | 1/1995 | Piety et al. | 250/330 |
| 5,460,041 A | * | 10/1995 | Andes et al. | 73/335.08 |
| 5,582,485 A | * | 12/1996 | Lesniak | 374/5 |
| 6,146,692 A | * | 11/2000 | Sangeeta et al. | 427/142 |
| 6,255,001 B1 | * | 7/2001 | Darolia | 428/610 |
| 6,341,941 B1 | * | 1/2002 | Namura et al. | 416/190 |
| 6,364,524 B1 | * | 4/2002 | Markham | 374/131 |

(Continued)

FOREIGN PATENT DOCUMENTS

GB    2164147 A  *  3/1986

(Continued)

OTHER PUBLICATIONS

Condition Monitoring of Steam Turbines by Performance Analysis. Ray Beebe. Apr. 1998.*

(Continued)

*Primary Examiner*—Gail Verbitsky
(74) *Attorney, Agent, or Firm*—Nixon & Vanderhye P.C.

(57) ABSTRACT

The invention involves the use of thermal imaging equipment to take infrared images of a steam turbine during start-up. The exterior temperatures developed from the infrared images are correlated with turbine vibration data to determine which insulation temperature patterns reflect insulation poor enough to cause packing seal teeth to rub and the turbine to vibrate during operation or shut-down. From the thermal images and vibration data, control limits are developed for insulation surface temperature. Insulation is added, before the steam turbine is shut down, in accordance with the obtained data and control limits.

9 Claims, 1 Drawing Sheet
(1 of 1 Drawing Sheet(s) Filed in Color)

U.S. PATENT DOCUMENTS

| | | | |
|---|---|---|---|
| 6,402,463 B1 * | 6/2002 | Jang et al. | 415/115 |
| 6,437,334 B1 * | 8/2002 | Thomas et al. | 250/341.6 |
| 6,464,393 B1 * | 10/2002 | Tatoh | 374/179 |
| 6,691,019 B1 * | 2/2004 | Seeley et al. | 701/100 |
| 6,733,907 B1 * | 5/2004 | Morrison et al. | 428/699 |
| 6,759,659 B1 * | 7/2004 | Thomas et al. | 250/341.6 |
| 2002/0037216 A1 * | 3/2002 | Oya et al. | 415/114 |
| 2003/0049126 A1 * | 3/2003 | Uematsu et al. | 416/97 R |
| 2003/0101726 A1 * | 6/2003 | Marin et al. | 60/677 |
| 2005/0036891 A1 * | 2/2005 | Spitsberg et al. | 416/241 R |

FOREIGN PATENT DOCUMENTS

| | | | | |
|---|---|---|---|---|
| JP | 59170407 A | * | 9/1984 | |
| JP | 359170407 A | * | 9/1984 | 415/118 |
| JP | 03061833 A | * | 3/1991 | |

OTHER PUBLICATIONS

Infrared Thermal Imaging. Analysis Mechanical Systems Using Infrared Thermography, no date.*

Infraterm Infrared and Vibration Analysis.*

Infrared Thermography for Condition Monitoring. Newport Solution. Copyright 2002.*

E403 Predictive maintenance (seminar). HPC technical Institute, no date.*

How to start a steam turbine maintenance program. By Field Data Specialists, Inc.*

Performing a steam system check up. A.Wright et al. Aug. 2000.*

Extend Service Life of HRSG Insulation. thermal Ceramics. Apr. 2000.*

* cited by examiner

USING THERMAL IMAGING TO PREVENT LOSS OF STEAM TURBINE EFFICIENCY BY DETECTING AND CORRECTING INADEQUATE INSULATION AT TURBINE STARTUP

FIELD AND BACKGROUND OF THE INVENTION

The invention is directed to the use of thermal imaging to assess insulation effectiveness for a steam turbine during start-up. More particularly, the invention uses thermal imaging to generate infrared images for identifying areas of the steam turbine lacking sufficient insulation, so that corrective action can be taken to prevent damage to turbine seals and associated losses in turbine efficiency.

Inadequate steam turbine insulation can cause uneven or rapid temperature changes in steam turbine shells, resulting in contact and damage to packing seal teeth between rotating and stationary parts. Damaged seals reduce steam turbine thermal efficiency.

SUMMARY OF THE INVENTION

The invention envisions the use of thermal imaging of steam turbine exteriors during startup thereby enabling inadequate insulation to be identified and corrected before it can contribute to vibration events that erode steam turbine efficiency.

The invention serves to establish control procedures based on obtained thermal (infrared) images of steam turbine insulation to enable inadequate insulation to be immediately recognized and corrected before uneven or rapid turbine shell cooling can cause packing teeth to become damaged and turbine efficiency to be lost.

By correlating turbine insulation temperatures from the obtained thermal images with the occurrence and severity of turbine vibrations, criteria can be identified for a specific or a particular type of steam turbine that are useful for determining insulation adequacy. Since vibration and packing damage from inadequate insulation normally occurs during turbine cool-down/shut-down, thermal imaging will facilitate adding insulation before shut down, thus avoiding damage to packing seal teeth.

Accordingly the invention provides a simple and quick way for turbine owners to preserve valuable turbine efficiency.

BRIEF DESCRIPTION OF THE DRAWINGS

The patent or application file contains a drawing executed in color. Copies of this patent or patent application publication with the color drawing will be provided by the office upon request and payment of the necessary fee.

DETAILED DESCRIPTION OF THE INVENTION

Figure 1:
FIG. 1 is an example of an infrared image of a steam turbine taken during start-up by digital thermal imaging equipment.

The invention consists of a process and criteria for using digital thermal imaging equipment to identify inadequate insulation before it can cause damage to turbine packing seals. Digital thermal cameras are used to obtain infrared images of a variety of steam turbines with new insulation. The exterior temperatures taken by the thermal imaging equipment are then correlated with turbine vibration data to determine which insulation temperature patterns reflect insulation poor enough to cause packing seal teeth to rub and the turbine to vibrate. As will be recognized by those skilled in the art, the patterns may vary for different types of steam turbines and may even vary for different steam turbines within one particular type of steam turbine.

From this data, criteria can be developed to identify insulation that allows too much heat to escape, creating the potential for packing seal damage because of uneven or rapid shell cooling during turbine shutdown. These criteria can be applied to turbines with new or reinstalled insulation to: (1) confirm insulation adequacy; or (2) highlight the need to supplement insulation before shutting the turbine down. Using this process should permit turbine owners to avoid degradation in valuable turbine efficiency due to poorly installed insulation.

Vibration data is frequently acquired during steam turbine startup. FIG. 1 shows an example of an infrared image taken of a steam turbine with new insulation, by digital thermal imaging equipment, and which can then be used in conjunction with acquired vibration data. As shown, in FIG. 1, location SP02 reflects a temperature more than 200° F. hotter than location SP04.

The exterior temperatures can then be correlated with the turbine vibration data to determine which insulation temperature patterns reflect insulation poor enough to cause packing seal teeth to rub and the turbine to vibrate during operation or shut-down due to uneven or rapid temperature changes in the steam turbine shells. From the thermal images and vibration data, control limits can be developed for insulation surface temperature particular to a specific steam turbine or class of steam turbines.

These procedures for using digital thermal (infrared) cameras can be developed and provided for those starting turbines that are new or have undergone maintenance. Preferably, when a turbine is started up and reaches full temperature, the thermal images are taken and evaluated against the control limits. If temperatures indicate inadequate insulation, more insulation can be added before turbine shutdown to avoid potential damage to packing seals.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. The method of using thermal imaging equipment for assessing insulation and seal effectiveness for a steam turbine by obtaining infrared images of the steam turbine during start-up, identifying areas in said steam turbine lacking sufficient insulation using said obtained infrared images and correlating known steam turbine vibration data to said identified areas lacking sufficient insulation in said obtained infrared images to obtain correlation data for assessing insulation and seal effectiveness.

2. The method of using thermal imaging equipment as claimed in claim 1, further including using said obtained infrared images for preserving turbine performance.

3. A method of assessing insulation effectiveness, preventing seal damage, and preserving turbine performance of a steam turbine, the method comprising:

obtaining infrared images of the steam turbine during start-up using thermal imaging equipment, identifying areas in said steam turbine lacking sufficient insulation by using said obtained infrared images; and correlating known steam turbine vibration data and said identified areas lacking sufficient insulation in said obtained infrared images to obtain correlation data and using said obtained correlation data to determine insulation effectiveness and to prevent damage to turbine seals.

4. The method of assessing insulation effectiveness, preventing seal damage, and preserving turbine performance of a steam turbine as claimed in claim 3, further comprising adding insulation to locations determined in accordance with said obtained infrared images.

5. The method of assessing insulation effectiveness, preventing seal damage, and preserving turbine performance of a steam turbine as claimed in claim 3, further comprising adding insulation to locations determined in accordance with said obtained correlation data.

6. The method of assessing insulation effectiveness, preventing seal damage, and preserving turbine performance of a steam turbine as claimed in claim 3, using said obtained correlation data for setting control limits for insulation surface temperatures.

7. The method of assessing insulation effectiveness, preventing seal damage, and preserving turbine performance of a steam turbine as claimed in claim 4 using, said obtained correlation data for setting control limits for insulation surface temperatures.

8. The method of assessing insulation effectiveness, preventing seal damage, and preserving turbine performance of a steam turbine as claimed in claim 5, using said obtained correlation data for setting control limits for insulation surface temperatures.

9. A method of assessing insulation effectiveness, preventing seal damage, and preserving turbine performance of a steam turbine, the method comprising:

obtaining infrared images of the steam turbine during start-up using thermal imaging equipment, identifying areas in said steam turbine lacking sufficient insulation by using said obtained infrared images; and correlating known steam turbine vibration data to said infrared areas to obtain correlation data; and adding insulation at said identified areas by using said obtained correlation data.

* * * * *